(No Model.)
M. E. HAMILTON.
WHIFFLETREE HOOK.
No. 300,252. Patented June 10, 1884.
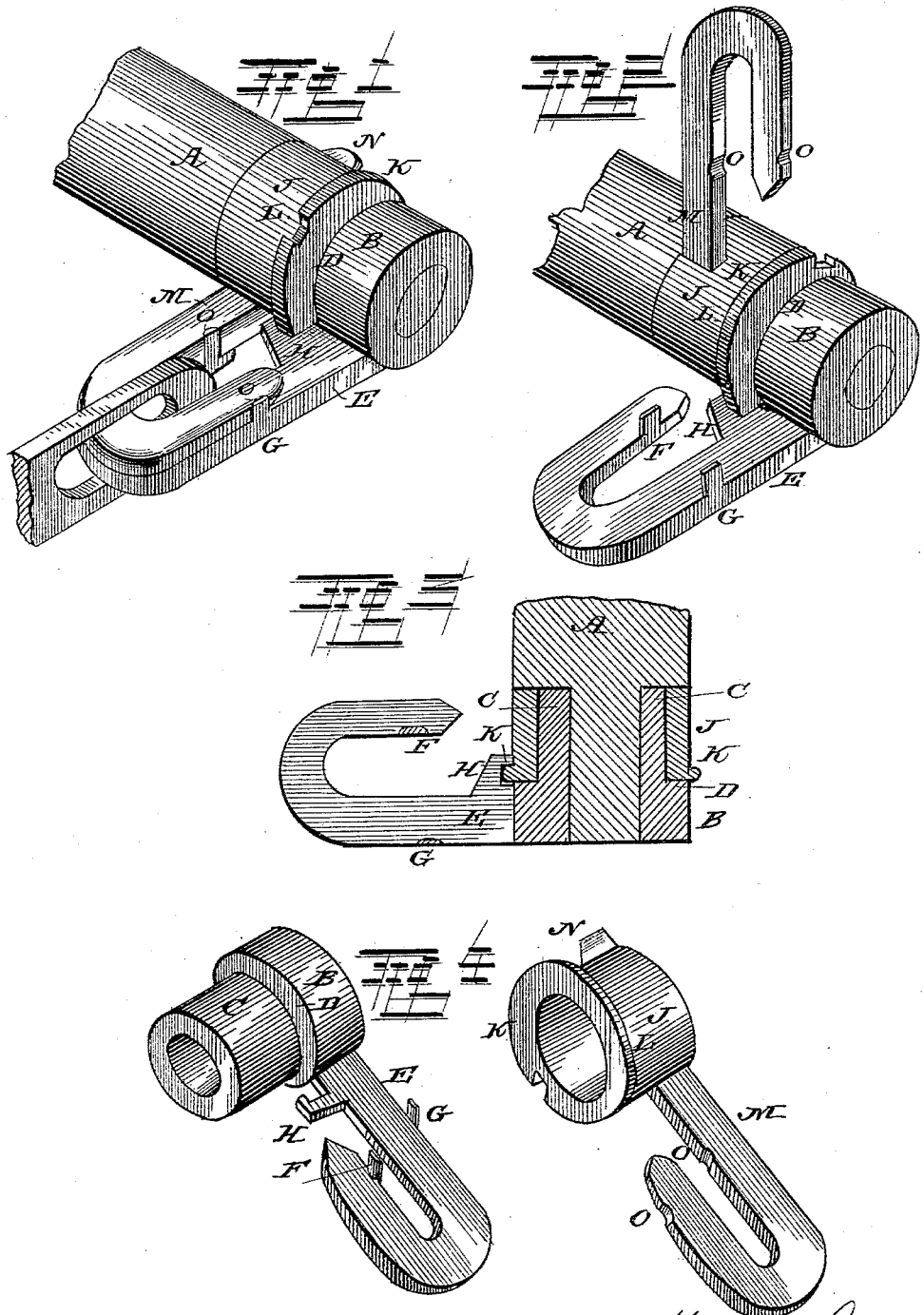
WITNESSES:
INVENTOR.
Miles E. Hamilton
By Louis Bagger & Co.
ATTORNEYS.

UNITED STATES PATENT OFFICE.

MILES E. HAMILTON, OF AUBURN, NEW YORK.

WHIFFLETREE-HOOK.

SPECIFICATION forming part of Letters Patent No. 300,252, dated June 10, 1884.

Application filed March 26, 1884. (No model.)

*To all whom it may concern:*

Be it known that I, MILES E. HAMILTON, a citizen of the United States, and a resident of Auburn, in the county of Cayuga and State of New York, have invented certain new and useful Improvements in Whiffletree-Hooks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the end of a whiffletree provided with my improved whiffletree-hook. Fig. 2 is a similar view showing the hook open. Fig. 3 is a longitudinal section, and Fig. 4 is a perspective view of the two parts of the hook detached.

Similar letters of reference indicate corresponding parts in all the figures.

My invention has relation to that class of whiffletree-hooks consisting of a hook secured upon the end of the whiffletree and a hook curved in the opposite direction to the rigid hook and turning with its inner end, which forms a collar upon the whiffletree; and it consists in the improved construction and combination of parts of the same, as hereinafter more fully described and claimed.

In the accompanying drawings, the letter A indicates the whiffletree, upon each end of which is secured a sleeve, B, having its inner end, C, reduced and formed with an enlarged shoulder, D, at its outer end, which shoulder is provided with a forwardly-projecting and inwardly and rearwardly curved hook, E, having its upper face flat, and provided upon the outer edge of its inner arm with an upwardly-projecting lug or lip, F, and upon the outwardly-facing edge of its arm with a similar lug or lip. The inner edge of the inner arm of the hook is provided with a notched inwardly-projecting hook-shaped lip, H, and a collar, J, turns upon the reduced end of the sleeve and is provided with a flange, K, fitting and turning in the notch of the hook-shaped lip, which flange has a notch, L, a short distance above a hook, M, of a shape and size corresponding to the rigid hook, but bent in the opposite direction, and projecting from the collar, which hook may rest with its flat under side upon the upper side of the rigid hook, and is provided in its outwardly-facing edges with notches or grooves O, corresponding to the lugs upon the rigid hook. These hooks will serve to guide the turning hook to fit exactly upon the rigid hook, and will prevent the outer ends of the hook from being spread by the strain upon them. The turning collar J is provided with a lip or lug, N, diametrically opposite to the hook, by means of which the movable hook may be tilted. It will be seen that the hook-shaped lip upon the rigid hook fitting over the flange upon the turning collar will prevent the said collar and its hook from sliding laterally, and the notch in the said flange, being above the hook upon the turning collar, it will be seen that it is necessary to turn the hook rearward and nearly an entire revolution around the sleeve before the notch will register with the notched hook-shaped lip upon the rigid hook, allowing the collar to be removed from the sleeve, which position it is impossible for the turning collar and hook to occupy as long as the eye of the trace is hooked over the two hooks, thus obviating all danger of the turning collar or hook working loose while the trace is hooked over the hooks.

I am aware that whiffletree-hooks have been made consisting of a rigid hook and a turning hook fitting over the rigid hook and bent in opposite directions, and I do not wish to claim such construction; but

I claim—

1. The combination, in a whiffletree-hook, of a rigid hook provided at the outwardly-facing edges of its inner and outer ends with two upwardly-projecting lugs, with a hook curved in the opposite direction and turning inside the rigid hook, with its inner end formed into a collar, and provided with notches upon the outwardly-facing edges of its inner and outer ends, adapted to fit upon the lugs of the rigid hook, as and for the purpose shown and set forth.

2. The combination, in a whiffletree-hook, of a rigid hook having a notched hook-shaped inwardly-projecting lip upon its inner end, with a turning collar having a hook curved in the opposite direction, and having a flange turning in the hook-shaped lip, and provided with a notch a short distance above the hook, as and for the purpose shown and set forth.

3. The combination of the rigid sleeve provided with the hook having the upwardly-projecting lugs upon the outwardly-facing edges of its inner and outer ends, and having the notched hook-shaped inwardly-projecting lip, with the collar turning upon the reduced inner end of the sleeve, provided with the hook turned in the opposite direction to the rigid hook, and having notches in the outwardly-facing edges of its inner and outer ends, and provided with the flange upon its outer end turning in the hook-shaped lip, and having a notch above the hook, as and for the purpose shown and set forth.

In testimony that I claim the foregoing as my own I have hereunto affixed my signature in presence of two witnesses.

MILES E. HAMILTON.

Witnesses:
FRANCIS E. HYATT,
S. J. WESTFALL.